United States Patent
Clements

(10) Patent No.: US 9,506,585 B2
(45) Date of Patent: Nov. 29, 2016

(54) FLEXIBLE PIPE BODY AND METHOD

(71) Applicant: Wellstream International Limited, Newcastle-upon-Tyne, Tyne and Wear (GB)

(72) Inventor: Richard Alasdair Clements, Durham (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 253 days.

(21) Appl. No.: 14/362,867

(22) PCT Filed: Dec. 12, 2012

(86) PCT No.: PCT/GB2012/053102
§ 371 (c)(1),
(2) Date: Jun. 4, 2014

(87) PCT Pub. No.: WO2013/088138
PCT Pub. Date: Jun. 20, 2013

(65) Prior Publication Data
US 2014/0311613 A1    Oct. 23, 2014

(30) Foreign Application Priority Data
Dec. 13, 2011  (GB) .................................. 1121410.3

(51) Int. Cl.
*F16L 11/08* (2006.01)
*F16L 11/16* (2006.01)
*F16L 11/24* (2006.01)

(52) U.S. Cl.
CPC .............. *F16L 11/24* (2013.01); *F16L 11/083* (2013.01); *F16L 11/16* (2013.01); *Y10T 29/49826* (2015.01)

(58) Field of Classification Search
CPC ................................ F16L 11/16; F16L 11/083
USPC ................................ 138/134, 135, 131, 139
See application file for complete search history.

(56) References Cited

U.S. PATENT DOCUMENTS

| 5,275,209 A * | 1/1994 | Sugier | F16L 11/16 138/129 |
| 6,516,833 B1 * | 2/2003 | Witz | F16L 11/083 138/120 |
| 6,904,939 B2 * | 6/2005 | Jung | F16L 11/16 138/131 |

(Continued)

FOREIGN PATENT DOCUMENTS

| CN | 102245953 A | 11/2011 |
| CN | 102272504 A | 12/2011 |

(Continued)

OTHER PUBLICATIONS

International Preliminary Report on Patentability of the International Searching Authority, mailed Jun. 26, 2014, for corresponding International Application No. PCT/GB2012/053102, 9 pages.

(Continued)

*Primary Examiner* — Patrick F Brinson
(74) *Attorney, Agent, or Firm* — Klarquist Sparkman, LLP

(57) ABSTRACT

A flexible pipe body and method of producing a flexible pipe body are disclosed. The flexible pipe body includes a layer comprising a tape element formed from at least a first sub-layer sandwiched between two further sub-layers, wherein the first sub-layer has a lower density than at least one of the two further sub-layers.

20 Claims, 3 Drawing Sheets

(56) References Cited

U.S. PATENT DOCUMENTS

| | | | |
|---|---|---|---|
| 7,268,562 B2 * | 9/2007 | Aisenbrey | A01K 3/005 138/140 |
| 2002/0129862 A1 | 9/2002 | Hupertz | |
| 2011/0192485 A1 | 8/2011 | Graham | |
| 2011/0214771 A1 | 9/2011 | Graham | |

FOREIGN PATENT DOCUMENTS

| | | |
|---|---|---|
| GB | 997917 | 7/1965 |
| WO | WO2011/073688 A1 | 6/2011 |

OTHER PUBLICATIONS

Notification of First Office Action and Search Report from the State Intellectual Property Office of the People's Republic of China, for Chinese Patent Application No. CN201280061445.X, dated May 15, 2015, 15 pages.

International Search Report and Written Opinion of the International Searching Authority, mailed Feb. 27, 2013, for corresponding International Application No. PCT/GB2012/053102, 12 pages.

* cited by examiner

FLEXIBLE PIPE BODY AND METHOD

CROSS REFERENCE TO RELATED APPLICATIONS

This is the U.S. National Stage of International Application No. PCT/GB2012/053102, filed Dec. 12, 2012, which in turn claims priority to and the benefit of United Kingdom Application No. GB1121410.3, filed Dec. 13, 2011.

The present invention relates to a flexible pipe body and method of providing the same. In particular, but not exclusively, the present invention relates to a flexible pipe body having a layer with superior energy absorption and strength per weight properties, useable for a carcass layer, armour layer or an outer layer, for example.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

In many known flexible pipe designs the pipe body may include a carcass layer. The carcass is generally the radially innermost layer and supports a fluid retaining layer (barrier layer). The carcass is provided to help the flexible pipe withstand the crushing forces experienced due to external pressures at deep and ultra-deep water depths, and due to crushing loads experienced due to pressures from outer armour layers. It is known to helically wrap a profiled tape to form a generally cylindrical carcass layer. The tape may have hook and valley regions so that as the tape is wound, adjacent windings are interlocked by nesting a hooked region of a first winding into a valley region of a following winding. The carcass layer is also useful to help withstand crushing loads for occasions when the pipe bore is depressurised for various reasons.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Flexible pipe may also be used for shallow water applications (for example less than around 500 meters depth) or even for shore (overland) applications.

One way to improve the load response and thus performance of armour layers or a carcass layer is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

WO2011/073687 and WO2011/073688 disclose a flexible pipe including a carcass layer of interlocked windings.

It is an aim of the present invention to at least partly mitigate the above-mentioned problems.

It is an aim of embodiments of the present invention to provide a layer of a flexible pipe body that has improved strength characteristics compared to known arrangements.

It is an aim of embodiments of the present invention to provide a layer of a flexible pipe body that has a high rigidity yet lower weight compared to known arrangements.

It is an aim of embodiments of the present invention to provide a layer of a flexible pipe body that has improved performance compared to known arrangements.

According to a first aspect of the present invention there is provided a flexible pipe body for transporting fluids from a sub-sea location, comprising:
  a layer comprising a tape element formed from at least a first sub-layer sandwiched between two further sub-layers, wherein the first sub-layer has a lower density than at least one of the two further sub-layers.

According to a second aspect of the present invention there is provided a method of providing a flexible pipe body for transporting fluids from a sub-sea location, comprising:
  providing a layer comprising a tape element formed from at least a first sub-layer sandwiched between two further sub-layers, wherein the first sub-layer has a lower density than at least one of the two further sub-layers.

Certain embodiments of the invention provide the advantage that a pipe body layer is provided that has adequate strength, rigidity and stiffness, yet has a reduced weight compared to a layer of solid material. The flexible pipe will therefore be able to withstand greater water depths, and/or require fewer buoyancy modules to offset tension in the pipe caused by the pipe's own weight.

Certain embodiments of the invention provide the advantage that a pipe body layer is provided that has a high second moment of inertia.

Certain embodiments of the invention provide the advantage that a pipe body layer is provided that is particularly useful as the carcass layer and/or an outer layer, and which has improved energy absorption properties.

Embodiments of the invention are further described hereinafter with reference to the accompanying drawings, in which.

In the drawings like reference numerals refer to like parts.

Figure 1:
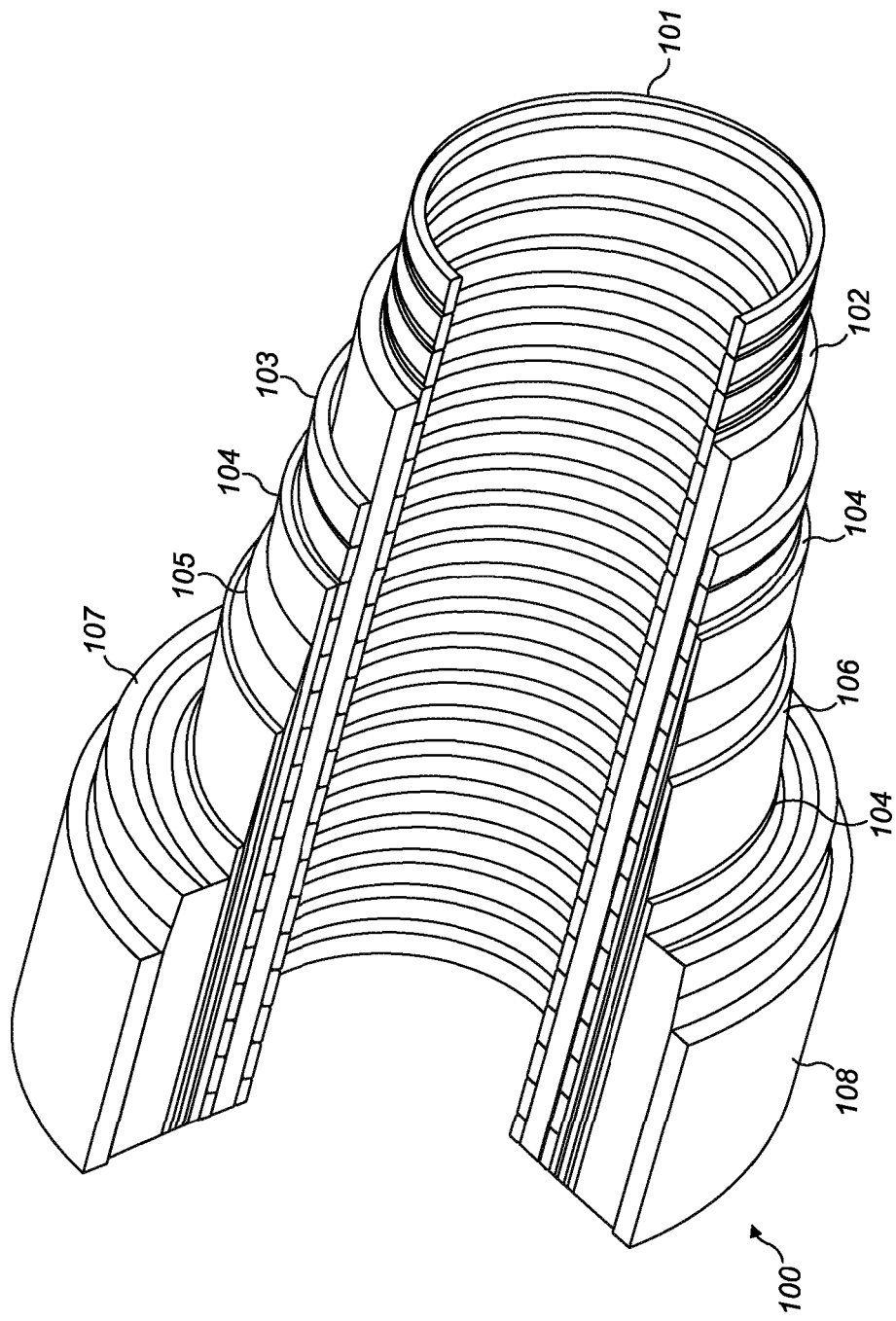
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

Figure 2A:
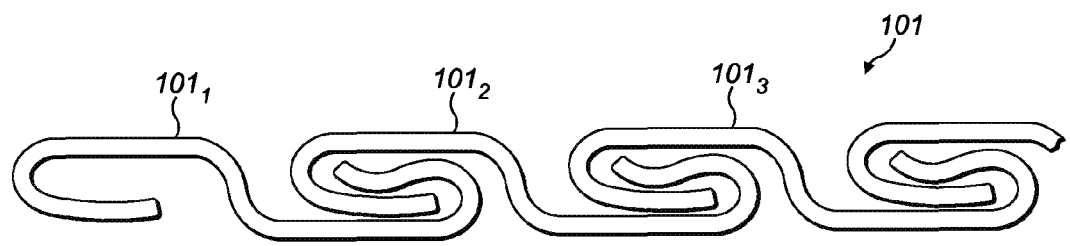
FIGS. 2a and 2b illustrate a carcass layer.
Figure 2B:
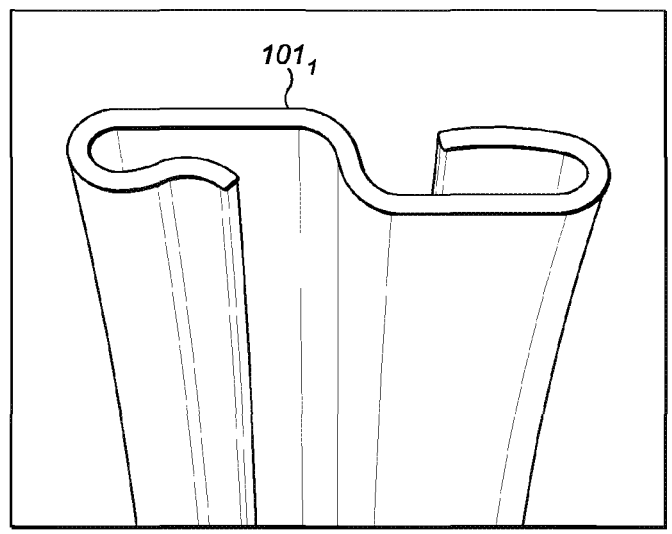

FIG. 2a shows a cross-section of a carcass layer 101 in more detail. The carcass layer is formed by helically winding a tape so that adjacent windings $101_1$, $101_2$, $101_3$, interlock. A single winding $101_1$ is shown in FIG. 2b.

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 3:
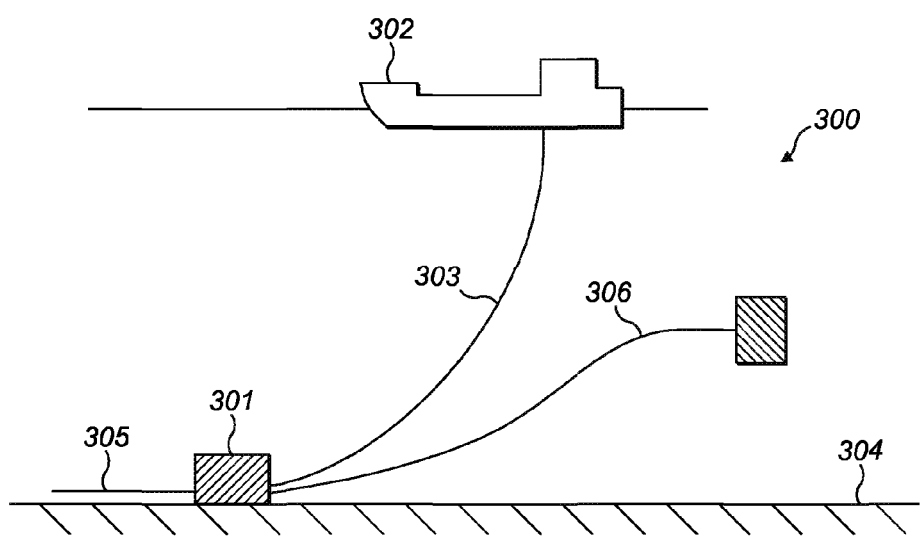
FIG. 3 illustrates a riser assembly.

FIG. 3 illustrates a riser assembly 300 suitable for transporting production fluid such as oil and/or gas and/or water from a sub-sea location 301 to a floating facility 302. For example, in FIG. 3 the sub-sea location 301 includes a sub-sea flow line. The flexible flow line 305 comprises a flexible pipe, wholly or in part, resting on the sea floor 304 or buried below the sea floor and used in a static application. The floating facility may be provided by a platform and/or buoy or, as illustrated in FIG. 3, a ship. The riser assembly 300 is provided as a flexible riser, that is to say a flexible pipe 303 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 3 also illustrates how portions of flexible pipe can be utilised as a flow line 305 or jumper 306.

Figure 4:
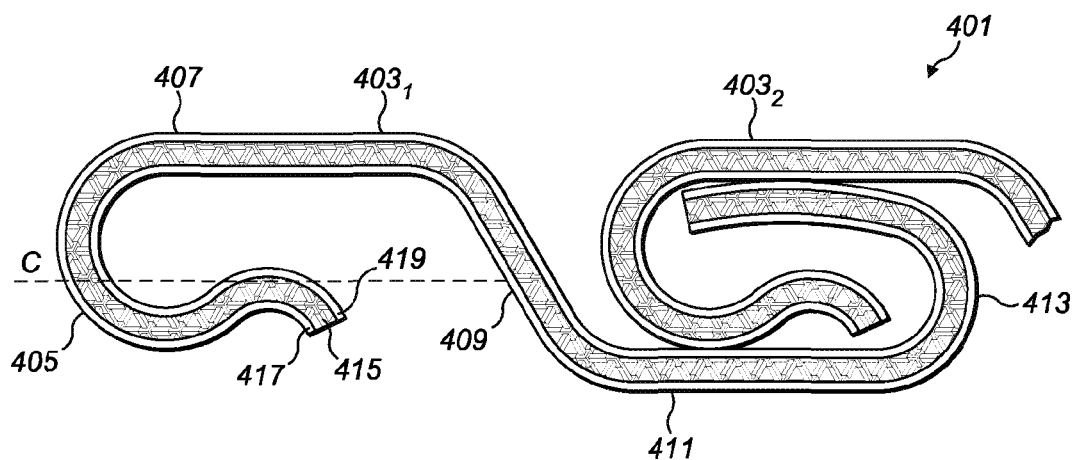
FIG. 4 illustrates a carcass layer.

FIG. 4 illustrates a cross-section of a carcass layer according to an embodiment of the invention. The carcass layer 401 is formed from a tape that is wound helically to form a layer extending axially along the length of the flexible pipe body. Here the adjacent windings $403_1$ and $403_2$ are, to an extent, interlocked. The cross-section of the carcass tape has an imaginary centre line C and has an inwardly turned portion 405 at a first edge of the tape. The portion 405 blends into a horizontal (linear) region 407 and the tape is then bent into a substantially linear region 409 which extends firstly towards the centre line and then onwards past the centre line. The central region 409 of the tape then turns away from the direction of the inwardly turned portion 405 into a further horizontal (linear) region 411 before bending again in towards the imaginary centre line C terminating in a further inwardly turned portion 413. In terms of the windings shown in FIG. 4 the first inwardly turned portion 405 is turned generally downwardly towards (and past) the imaginary centre line and the further inwardly turned portion 413 is turned generally upwardly towards (and past) the imaginary centre line.

As illustrated in FIG. 4 (and in the same manner as in FIG. 2a) an inwardly turned portion 405 of a first winding rides between a linear region 409 and a further inwardly turned portion 413 of an adjacent winding, which act as abutment surfaces that form boundaries to the riding surface. This allows for some lateral motion between adjacent windings. A further inwardly turned portion 413 of a first winding rides between a inwardly turned portion 405 and a linear region 409 of an adjacent winding, which act as abutment surfaces that form boundaries to the riding surface. This allows for some lateral motion between adjacent windings.

The carcass tape is preformed prior to winding to manufacture a carcass layer. In this example, the tape is formed from a first sub-layer 415 sandwiched between a further sub-layer 417 and a yet further sub-layer 419.

Figure 5:
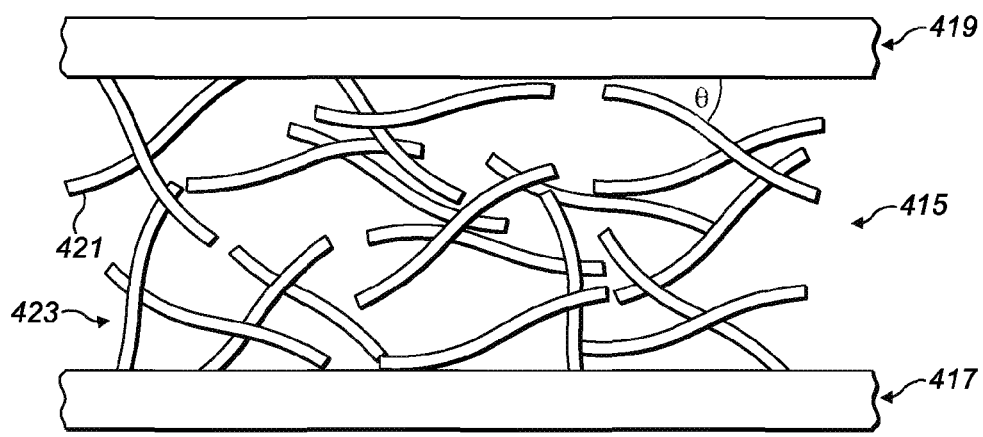
FIG. 5 illustrates an enlarged view of part of the carcass layer of FIG. 4.

The tape cross-section is shown in more detail in FIG. 5. In this example the further sub-layers 417,419 are stainless steel faceplates and the first sub-layer is formed from a plurality of stainless steel fibres (filaments) 421 that are semi-randomly orientated with holes or open areas therebetween. As such, the first sub-layer 415 has a lower density than at least one of the two further sub-layers 417,419. The fibres are termed 'semi-randomly' orientated because they are generally randomly positioned, though slightly squashed between the two faceplates 417,419 so that a majority of the fibres 421 have a lay angle θ of between around 20° to 80° from the axis of the adjacent faceplate. The fibres and faceplates are heated by brazing or sintering and diffusion bonded until the assembly is formed into a single structure. A product that fits this description is known as Fibrecore™.

In a typical embodiment of the invention, the fibres 421 may have a diameter of around 10 to 1000 μm, for example, and more preferably between 50 and 100 μm. The volume fraction of fibres 421 in the first sub-layer 415 may be around 5 to 50% and more preferably between 10 to 30%. The thickness of the first sub-layer 415 may be around 0.5 to 2 mm and more preferably between 0.8 and 1.4 mm. The thickness of the further sub-layers 417,419 may be around 0.1 to 1 mm and more preferably between 0.2 and 0.4 mm.

As used herein, the term filament is used to encompass any kind of fibre, strand, thread, etc. The filaments may be provided individually or in the form of wadding, for example.

With the invention described above, the layer has an excellent strength to weight ratio and high stiffness, yet retains formability and weldability. That is, the strength of the layer is increased without increasing its weight (or, the weight is reduced for the same thickness of material).

The above-described layer is particularly useful for energy absorption, whereby upon the layer being impacted, energy is spread through the fibres in many directions, to absorb the impact. This layer is therefore useful as an outer layer to absorb impacts such as collision with a vessel, for example, and as a carcass layer or armour to withstand crushing pressures, for example.

The layer may also have further advantages in terms of resistance to fire, since a sub-layer closer to a fire is separated by the filament sub-layer from the remainder of the layer. As such, there is a separation of heat from the remainder of the pipe body.

Various modifications to the detailed designs as described above are possible. For example, whilst the embodiment above describes a carcass layer, the arrangement of sub-layers could equally be used to form a different layer of flexible pipe body, such as an armour layer, or an outer layer.

Whilst a particular shaped carcass layer has been described, other cross-sectional shapes may be used. For example, the tape may be simply a flat rectangular profiled tape that does not interlock. This may be useful and cost effective as an inner (i.e. not the radially outermost and not the radially innermost) layer of a pipe body, such as an armour wire. Alternatively the profile may be stepped so that adjacent windings have a degree of overlap. Alternatively, the layer may have a corrugated profile, which may be useful in low temperature applications.

Although the layer 401 has been described as made of stainless steel, other materials could be used, such as carbon steel, carbon manganese steel, microalloy steel, low alloy steel, titanium alloy, nickel alloy or mixtures thereof. The filaments and outer sub-layers may be made from respectively different materials. For example the filaments may be cloth of woven, braided or knitted fibres. It is noted that nickel alloy gives a good performance pipe layer, and use of nickel alloy for one of the outer sub-layers, i.e. the sub-layer that will form the radially innermost face of the pipe body, will give good erosion resistance as a carcass layer, yet saving the cost of forming the entire carcass from nickel alloy. Alternatively, for an outer layer of a flexible pipe body, the radially outermost sub-layer could be formed from nickel alloy to give good erosion protection.

When the filaments are of non-metal material, the insulating properties of the layer may be increased. This will have benefits in terms of helping to prevent temperatures gradients across the pipe structure. Temperature gradients can have adverse affects on gas migration, for example. Insulation may be further increased by sealing the remaining sides of the filament sub-layer with side walls.

Although three sub-layers have been described above, the layer could have a different number of sub-layers, as required by the particular application. In a simpler form, a layer could comprise a homogenous metal faceplate sub-layer and a filament sub-layer, whereby the filament sub-layer is located adjacent another pipe body layer in use.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body for transporting fluids from a sub-sea location, comprising:

a layer comprising a helically wound tape, wherein the tape is preformed prior to winding, such that it is formed from at least a first sub-layer sandwiched between two further sub-layers, wherein the first sub-layer has a lower density than at least one of the two further sub-layers and wherein the first sub-layer comprises (i) a plurality of filaments of metal, composite, glass, or carbon fibre, or (ii) cloth of woven, braided or knitted fibres.

2. Flexible pipe body as claimed in claim 1, wherein the first sub-layer has a lower density than both the two further sub-layers.

3. Flexible pipe body as claimed in claim 1, wherein the further sub-layers are each of homogenous material.

4. Flexible pipe body as claimed in claim 1 wherein the first sub-layer comprises the plurality of filaments, which are randomly or semi-randomly orientated.

5. Flexible pipe body as claimed in claim 1 wherein the first sub-layer comprises the plurality of filaments, which are sintered or brazed or otherwise adhered to the further sub-layers.

6. Flexible pipe body as claimed in claim 1 wherein the first sub-layer comprises the plurality of filaments, which define one or more holes between the filaments and between the further sub-layers.

7. Flexible pipe body as claimed in claim 1 wherein the first sub-layer comprises the plurality of filaments, which are of stainless steel.

8. Flexible pipe body as claimed in claim 1 wherein the two further sub-layers are of stainless steel.

9. Flexible pipe body as claimed in claim 1, wherein the first sub-layer comprises the plurality of filaments, which are of a nickel alloy.

10. Flexible pipe body as claimed in claim 1 wherein at least one of the two further sub-layers is of a nickel alloy.

11. Flexible pipe body as claimed in claim 1 wherein the first sub-layer comprises the plurality of filaments, which are of a titanium alloy.

12. Flexible pipe body as claimed in claim 1 wherein at least one of the two further sub-layers is of a titanium alloy.

13. Flexible pipe body as claimed in claim 1 wherein the tape is helically wound and the tape element has a cross-sectional profile such that adjacent windings of the tape interlock.

14. Flexible pipe body as claimed in claim 13 wherein the cross-sectional profile of the tape is configured such that interlocked adjacent windings are allowed a degree of lateral movement.

15. Flexible pipe body as claimed in claim 1 wherein the tape is helically wound such that adjacent windings of the tape do not interlock and the tape has a cross-sectional profile that has a width greater than a thickness.

16. Flexible pipe body as claimed in claim 1 wherein the tape is helically wound such that adjacent windings of the tape do not interlock and the tape has a stepped cross-sectional profile such that adjacent windings of the tape have a degree of overlap.

17. Flexible pipe body as claimed in claim 1 wherein the layer is a carcass, armour layer or outer layer.

18. A method of providing a flexible pipe body for transporting fluids from a sub-sea location, comprising:
providing a layer comprising a helically wound tape, preforming the tape prior to winding such that it is formed from at least a first sub-layer sandwiched between two further sub-layers, wherein the first sub-layer has a lower density than at least one of the two further sub-layers layers, and wherein the first sub-layer comprises (i) a plurality of filaments of metal, composite, glass, or carbon fibre, or (ii) cloth of woven, braided or knitted fibres.

19. A method as claimed in claim 18 further comprising the steps of winding the tape helically and interlocking adjacent windings.

20. A method as claimed in claim 18 further comprising the steps of winding the tape helically and overlapping adjacent windings.

* * * * *